US012262180B2

(12) United States Patent
Müller-Wehlau et al.

(10) Patent No.: US 12,262,180 B2
(45) Date of Patent: Mar. 25, 2025

(54) METHOD FOR FITTING A DIGITAL HEARING AID, HEARING AID AND COMPUTER PROGRAM PRODUCT

(71) Applicant: Sivantos Pte. Ltd., Singapore (SG)

(72) Inventors: Matthias Müller-Wehlau, Nuremberg (DE); Richard Schultz-Amling, Nuremberg (DE)

(73) Assignee: Sivantos Pte. Ltd., Singapore (SG)

( * ) Notice: Subject to any disclaimer, the term of this patent is extended or adjusted under 35 U.S.C. 154(b) by 356 days.

(21) Appl. No.: 17/883,816

(22) Filed: Aug. 9, 2022

(65) Prior Publication Data

US 2023/0044076 A1 Feb. 9, 2023

(30) Foreign Application Priority Data

Aug. 9, 2021 (DE) ..................... 10 2021 208 643.8

(51) Int. Cl.
*H04R 25/00* (2006.01)

(52) U.S. Cl.
CPC ........... *H04R 25/505* (2013.01); *H04R 25/30* (2013.01)

(58) Field of Classification Search
CPC ...... H04R 25/505; H04R 25/30; H04R 25/70; H04R 25/356
See application file for complete search history.

(56) References Cited

U.S. PATENT DOCUMENTS

| | | | |
|---|---|---|---|
| 5,710,820 | A | 1/1998 | Martin et al. |
| 7,068,802 | B2 | 6/2006 | Schulz et al. |
| 10,306,378 | B2 | 5/2019 | Petrausch et al. |

FOREIGN PATENT DOCUMENTS

| | | | |
|---|---|---|---|
| DE | 10131964 | A1 | 1/2003 |
| DE | 102016221692 | B3 | 12/2017 |
| EP | 0676909 | A1 | 10/1995 |
| EP | 0844804 | A1 | 5/1998 |
| JP | H06335474 | A | 12/1994 |
| JP | 2004179965 | A | 6/2004 |

OTHER PUBLICATIONS

English translation of Japanese PatentJP 2004-179965 Translation. "Automatic Amplification Characteristic Adjusting Device for Hearing Aid". Fukumoto Yoshitomo (Year: 2004).*

* cited by examiner

*Primary Examiner* — Brian Ensey
(74) *Attorney, Agent, or Firm* — Laurence A. Greenberg; Werner H. Stemer; Ralph E. Locher

(57) ABSTRACT

A method fits a digital hearing aid having an input transducer, a signal processing device and an output transducer. The signal processing device is configured to form an evaluation unit, a comparator unit, and a pre-amplification unit. An acoustic test signal is generated by an external testing device while the hearing aid is worn by a hearing-aid wearer. A digital test input signal is generated by the input transducer on the basis of the acoustic test signal. A sound pressure-dependent test quantity is determined on the basis of the digital test input signal by the evaluation unit. A deviation between the sound pressure-dependent test quantity and a reference quantity stored in the signal processing device is determined by the comparator unit. A pre-amplification by the pre-amplification unit is adjusted on the basis of the determined deviation.

12 Claims, 2 Drawing Sheets

METHOD FOR FITTING A DIGITAL HEARING AID, HEARING AID AND COMPUTER PROGRAM PRODUCT

CROSS-REFERENCE TO RELATED APPLICATION

This application claims the priority, under 35 U.S.C. § 119, of German Patent Application DE 10 2021 208 643.8, filed Aug. 9, 2021; the prior application is herewith incorporated by reference in its entirety.

FIELD AND BACKGROUND OF THE INVENTION

The invention relates to a method for fitting a digital hearing aid having an input transducer, a signal processing device and an output transducer. Moreover, the invention relates to a hearing aid and to a computer program product.

Hearing aids typically refer to conventional hearing-aid devices, which allow hearing deficits to be compensated. Such hearing aids serve to treat the hard of hearing, that is to say humans with a functional deficit of the hearing organ.

In the case of a corresponding functional deficit of the hearing organ, the hearing threshold is generally modified in at least one frequency range or frequency band, to the effect of the affected person who is hard of hearing only perceiving acoustic signals in the corresponding frequency range at a higher or elevated sound pressure level. Therefore, to compensate or at least partly compensate such a hearing deficit by means of a hearing aid, there expediently is an adjustment or change in sound pressure levels, to the effect of mapping an input-side level range at the input of the hearing aid on an output-side level range on the output of the hearing aid.

In this context, digital hearing aids, in particular, are widespread, as are described in German patents DE 10 2016 221 692 B3 (corresponding to U.S. Pat. No. 10,306,378) and DE 101 31 964 A1 (corresponding to U.S. Pat. No. 7,068, 802), for example.

Digital hearing aids usually have an input transducer, a signal processing device and an output transducer as essential components. Expediently, an acousto-electric transducer, that is to say microphone in particular, and an analog-to-digital converter are parts of the input transducer. In turn, the output transducer typically includes a digital-to-analog converter and either an electro-mechanical transducer, for example a bone conduction receiver, or an electro-acoustic transducer, for example a miniaturized loudspeaker, which is also referred to as a "receiver".

The above-described mapping of the input-side level range on the output-side level range is then expediently implemented by an aforementioned signal processing device, which as a rule is realized by an electronic circuit realized on a printed circuit board. In this context, such a signal processing device for implementing an appropriate mapping is typically configured so that digital input signals from the analog-to-digital converter are processed with the aid of a number of data processing modules and digital output signals for the digital-to-analog converter are generated as a result. The data processing modules usually are programmable data processing modules, that is to say software programs or software program modules in particular.

Moreover, the mapping is preferably implemented in such a way that the corresponding hearing aid exhibits a compressive behavior. Thus, if the sound pressure level at the output of the hearing aid is plotted as a function of the sound pressure level at the output of the hearing aid, it is evident that at least above a given threshold the sound pressure level at the output, that is to say the output level, increases more slowly than the sound pressure level at the input, that is to say the input level.

SUMMARY OF THE INVENTION

Using this as a starting point, the invention is based on the object of specifying an advantageous method for fitting a digital hearing aid. Moreover, it is an object of the invention to specify an advantageously embodied hearing aid and an advantageous computer program product.

According to the invention, this object is achieved by a method having the fea-tures of the independent method claim and by a hearing aid having the features of the independent hearing aid claim and by a computer program product having the features of the independent computer program product claim. Preferred developments are contained in the dependent claims. The advantages and preferred embodiments listed in relation to the method are analogously transferable to the hearing aid, and vice versa. Moreover, the advantages and preferred embodiments listed in relation to the method are analogously transferable to the comput-er program product, and vice versa.

The method according to the invention in this case serves to fit a digital hearing aid. Conversely, a digital hearing aid according to the invention is configured so that the method according to the invention is implementable therewith. In this case, the digital hearing aid, also referred to as hearing aid for short below, typically is configured in the style of a hearing aid as described at the outset and contains an input transducer, a signal processing device and an output transducer.

In this case, the input transducer serves to generate digital input signals on the basis of acoustic input signals which are incident on the hearing aid on the input side. To this end, the input transducer expediently contains an acousto-electric transducer, that is to say at least one microphone in particular, and an analog-to-digital converter. The corresponding digital input signals are then processed in the signal processing device, with digital output signals being generated on the basis of the digital input signals. Finally, acoustic output signals are generated on the basis of the digital output signals by the output transducer and are output on the output side of the hearing aid, to be precise into an auditory canal of the hearing-aid wearer. In this case, the output transducer typically has a digital-to-analog converter and an electro-acoustic transducer, for example a loudspeaker.

The signal processing device is further configured to form an evaluation unit, a comparator unit, and a pre-amplification unit. The corresponding units, that is to say the evaluation unit, the comparator unit and the pre-amplification unit, are typically formed by signal processing modules or data processing modules, in particular data processing modules of the type set forth at the outset, that is to say software program modules for example.

Now, a first fitting session part is carried out when carrying out the method according to the invention, for fitting the hearing aid, that is to say the digital hearing aid, to a hearing-aid wearer, in particular the aforementioned hearing-aid wearer. In this context, an acoustic test signal is generated with the aid of an external testing device, that is to say a testing device that is not part of the hearing aid. In this case, the acoustic test signal is generated while the hearing aid is worn by the hearing-aid wearer, that is to say in particular by the hearing-aid wearer for whom the hearing aid is intended and to whom the hearing aid is fitted. Consequently, the hearing-aid wearer is the so-called consumer in particular.

Then, a digital test input signal, that is to say a digital input signal that depends on the acoustic test signal, is generated on the basis of the acoustic test signal by means of the input transducer of the hearing aid. In this case, the generated acoustic test signal typically causes an acoustic input signal at the input of the hearing aid and a digital input signal, specifically the digital test input signal, is then generated by the input transducer on the basis of this input signal.

It should be observed in this case that the generated acoustic test signal is generated by one loudspeaker or a plurality of loudspeakers of the external testing device, for example. The acoustic test signal is then further modified by the spatial conditions in particular, that is to say for example also by the hearing-aid wearer. Consequently, the acoustic input signal then incident on the hearing aid at the input side depends firstly on the generated acoustic test signal and secondly on the spatial conditions, which are also determined, inter alia, by the shape of the head of the hearing-aid wearer and, in particular, by the shape of the external ears of the hearing-aid wearer.

Further, a sound pressure-dependent test quantity is determined on the basis of the test input signal by means of the evaluation unit of the signal processing device. This sound pressure-dependent test quantity is then compared to a reference quantity stored in the signal processing device by means of the comparator unit and a deviation is determined between the sound pressure-dependent test quantity and the reference quantity. Then, a pre-amplification is adjusted by the pre-amplification unit on the basis of the determined deviation.

In this case, the corresponding pre-amplification also determines the mapping described at the outset of the input-side level range on the output-side level range by the hearing aid. However, the pre-amplification typically is additional amplification in addition to the amplification according to the prior art described at the outset. Therefore, the pre-amplification is preferably adjusted independently of a hearing deficit of the hearing-aid wearer. That is to say, the hearing deficit of the hearing-aid wearer remains unconsidered in an adjusted pre-amplification. An amplification according to the prior art as described at the outset is preferably additionally implemented by means of the main amplification by a main amplification unit.

It is further advantageous if a pre-amplification is realized, by means of which input-side sound pressure levels are increased by a specified amount. Thus, a digital input signal is initially generated by means of the input transducer in this case. This digital input signal represents an acoustic signal with a measured sound pressure level value, the acoustic signal having been determined or measured. As a result of the pre-amplification, this digital input signal is converted into a pre-amplified digital input signal, with the sound pressure level of the pre-amplified digital input signal having been increased by the specified amount starting from the measured sound pressure level value. The increase by the specified value is implemented here independently of the measured value of the sound pressure level. Thus, there is a type of offset shift of the sound pressure level when converting digital input signals into pre-amplified digital input signals. In accordance with an alternative variant, input-side sound pressure levels are increased by a factor, specifically a pre-gain factor, by the pre-amplification.

Depending on the application, the aforementioned sound pressure-dependent test quantity is a sound pressure level value for example. In such a case, the reference quantity is then expediently also specified by a sound pressure level value. In accordance with an advantageous alternative, the sound pressure-dependent test quantity and/or the reference quantity is a quantity that is derivable from a corresponding sound pressure level value. In accordance with a further alternative, the sound pressure-dependent test quantity is for example a mathematical function which assigns different sound pressure level values to different frequencies, or a group of a plurality of sound pressure level values for a plurality of frequency ranges.

Further, the acoustic test signal is preferably specified by a noise signal or sequence of successive noise signals. Independently thereof, a sound pressure level value is specified for the acoustic test signal. In this case, the sound pressure level value is specified for example on the basis of information in a specified digital test signal that is preferably used to generate the acoustic test signal by means of the external testing device.

If a sound pressure level value is now specified for the acoustic test signal, the sound pressure level (SPL) value is preferably between 60 dB and 80 dB, that is to say at 65 dB, for example.

It is moreover advantageous if only the aforementioned acoustic test signal with the specified sound pressure level value is used for the purposes of adjusting the pre-amplification by the pre-amplification unit. Then, using to this end a further acoustic test signal with a further sound pressure level value is preferably dispensed with. However, at least the use of a further sound pressure level value is preferably dispensed with. Thus, if a plurality of acoustic test signals are used, the same sound pressure level value is preferably specified for all of these.

In the above-described first fitting session part, it is generally not necessary to generate acoustic output signals. Hence, this is dispensed with in some applications. Independently of whether acoustic output signals are generated by the hearing aid in the first fitting session part, the measurement of corresponding acoustic output signals, in particular by means of an external probe of the testing device, is preferably dispensed with. For example, introducing a microphone of the testing device into the auditory canal of the hearing-aid wearer is dispensed with.

It is further expedient for the digital hearing aid to be in the form of a multichannel hearing aid. Then, 4 to 10 channels are preferably realized in this case. In the case of such an embodiment of the digital hearing aid, the signal processing device expediently initially implements a channel-dependent and hence frequency-dependent separation or split of a digital input signal into a plurality of partial signals. In this case, each partial signal reproduces a frequency range of the digital input signal assigned to a channel. The resultant partial signals are then further preferably processed further independently of one another in the individual channels and are combined at the end to form the digital output signal.

Alternatively, there is a channel-dependent and hence frequency-dependent separation or split still before a digitization by way of the aforementioned analog-to-digital converter of the input transducer, that is to say on an analog level. However, ultimately the aforementioned digital partial signals are generated and subsequently processed further in both cases.

In an advantageous development, an evaluation unit, a comparator unit and a pre-amplification unit of the above-described type is then realized for each channel and, further preferably, the pre-amplification of the aforementioned type is carried out for each channel.

Particularly in this case, the acoustic test signal or at least the underlying digital test signal then preferably contains a component for each channel or at least a plurality of components for a plurality of channels. In this case, each component is typically given by a noise signal in a specified frequency band. Then, the components are for example strung together in a sequence. Alternatively, a separate acoustic test signal is generated for each channel.

It is moreover advantageous for the pre-fitting session to be part of the method according to the invention. Then, a specified digital test signal, in particular the aforementioned digital test signal, is used within such a pre-fitting session in order to generate an acoustic reference signal by means of an external reference testing device. Once again, the corresponding reference testing device is not part of the hearing aid and moreover preferably is a device that differs from the afore-mentioned external testing device. The reference testing device typically contains at least one loudspeaker and moreover a test holder, for example a holding arm or an artificial head. The digital hearing aid is held by the test holder while the acoustic reference signal is generated.

Thus, the first fitting session part and the pre-fitting session are consequently two method parts or partial processes which are expediently carried out with a time offset. In this case, the pre-fitting the session is typically carried out before the first fitting session part. Moreover, the pre-fitting session preferably takes place at the digital hearing-aid manufacturer while the first fitting session part preferably takes place at a service provider, for example an audiologist. Apart from that, what are known as laboratory conditions are typically present during the pre-fitting session, these in particular also being specified by the test holder. By contrast, realistic conditions are simulated during the first fitting session part, by virtue of the hear-ing aid being worn by the hearing-aid wearer.

Now, the specified digital test signal thus is used in the pre-fitting session to generate the acoustic reference signal by means of the external reference testing device. Further, a digital reference input signal, that is to say a digital input signal on the basis of the acoustic reference signal, then is generated by means of the input transducer on the basis of the acoustic reference signal. In this case, the acoustic reference signal causes an acoustic input signal at the input of the digi-tal hearing aid, the acoustic input signal being dependent on the reference testing device, and the digital input signal that is dependent on the acoustic reference signal, specifically the digital reference input signal, is generated by means of the input transducer on the basis of this acoustic input signal. Further, the aforementioned reference quantity is determined on the basis of the digital reference input signal by means of the evaluation unit and this reference quantity is then stored in the signal processing device, that is to say in particular saved in a permanent memory.

The aforementioned specified digital test signal is moreover usually used to generate the acoustic test signal by means of the external testing device. This is then implemented within the part of the method that was referred to as first fitting ses-sion part above. Here, reference is made to the fact that the specified digital test signal usually brings about a different acoustic input signal at the input of the hearing aid in the pre-fitting session than in the first fitting session part. The reason for this lies in the differences in the conditions present, which are determined by the utilized devices, that is to say the reference testing device on the one hand and the testing device on the other hand, and by the different ambient conditions for the hearing aid. Thus, the hearing aid is held by the test holder in one case and worn by the hearing-aid wearer in the other case.

Further, variants of the method in which the pre-amplification unit is disposed upstream of the evaluation unit are advantageous. That is to say that, in the sequence of the signal processing in the signal processing device, i.e., in the sequence of the individual process steps or the method steps of the signal processing, the amplification unit is initially applied to a signal and the evaluation unit is only applied during the further course of the signal processing. Thus, the pre-amplification preferably occurs first, and the evaluation only subsequently. Depending on the application, there then for example is an adjustment of the pre-amplification starting from a preset pre-amplification. Then, a type of control loop is realized in some cases, by means of which the pre-amplification is adjusted until test quantity and reference quantity correspond, and hence no deviation is determined any more.

As already indicated previously, it is moreover expedient for the signal processing unit to be configured to form a main amplification unit. Such a main amplification unit is typically also formed by a signal processing module or data processing module, in particular a data processing module of the type set forth at the outset, that is to say for example by a software program module. It is furthermore disposed downstream of the pre-amplification unit, that is to say disposed downstream from a signal processing point of view in particular, and preferably serves to implement an amplification according to the prior art as described at the outset. The amplification by the main amplification unit is referred to as main amplification below.

In an advantageous development, pre-amplification unit and main amplification unit operate independently of one another. In this case, the main amplification unit typically operates in the style of an amplifier unit according to the prior art, with the main amplification unit however being fed signals that were pre-amplified by the pre-amplification unit. These pre-amplified signals are then usually processed by the main amplification unit in the same way as the digital input signals are processed by an amplifier unit according to the prior art. Consequently, the main amplification unit therefore preferably has no knowledge of the pre-amplification unit and, accordingly, the effect of the pre-amplification unit is then not taken into account by the main amplification unit.

Independently thereof, the pre-amplification unit preferably does not operate compressively, whereas the main amplification unit preferably operates compressively, that is to say exhibits compressive behavior.

Now, if an above-described main amplification unit is provided and realized by the signal processing device, the method preferably has a further part or process, which is referred to below as second fitting session part. Preferably, the main amplification by the main amplification unit is adjusted in this second fitting session part. Here, the second fitting session part is expediently carried out after the first fitting session part has been completed. Further preferably, the main amplification is adjusted on the basis of a hearing deficit of the hearing-aid wearer, and accordingly the second fitting session part typically corresponds to a conventional fitting session according to the prior art, at least in view of the adjustment of the signal processing device.

The second fitting session part is preferably carried out at a service provider, for example an audiologist. Moreover, the first fitting session part is preferably carried out at the service provider, for example an audiologist. Further preferably, both parts, that is to say the first and the second fitting session part, are carried out at a service provider, for example at an audiologist, to be precise at the same service provider in particular. By contrast, the pre-fitting session preferably takes place at the manufacturer of the digital hearing aid.

Furthermore, it is advantageous if the main amplification unit is disposed downstream of the evaluation unit, that is to say if the main amplification unit is disposed downstream of the evaluation unit from a signal processing point of view. Consequently, the evaluation by the evaluation unit and, in particular, the determination of the sound pressure-dependent test quantity are implemented in the first fitting session part before the main amplification and hence in particular also independently of the main amplification by the main amplification unit.

Moreover, it is advantageous if the sound pressure-dependent test quantity is stored in the signal processing device, that is to say for example saved in a permanent memory of the signal processing device.

Moreover, it is advantageous if the signal processing device automatically recognizes which digital test signal is used during the first fitting session part to generate the acoustic test signal or at least whether the envisaged digital test signal is used. In such a case it is further advantageous if the adjustment of the pre-amplification is only carried out if a reference quantity correlating with the recognized digital test signal is stored in the signal processing device. This can avoid the inadvertent use of an incorrect signal for a pre-amplification adjustment.

Then, in an advantageous development, a plurality of digital test signals are available for selection and a respective reference quantity is stored in the signal processing device for a plurality of digital test signals. Preferably, the hearing aid then is configured so that the signal processing device identifies the digital test signal from the selection that has been used. Subsequently, the signal processing device then selects the reference quantity corresponding to the identified digital test signal for the adjustment of the pre-amplification and uses this reference quantity for comparison with the test quantity.

The above-described method according to the invention serves to fit a hearing aid according to the invention and, accordingly, is configured to this end. Conversely, the hearing aid according to the invention is configured, in at least one mode of operation, to carry out the method according to the invention. To this end, the hearing aid in particular contains the above-described signal processing device. Then, a number of method steps of the method are preferably carried out by means of the signal processing device, with, to this end, an executable program further preferably being stored and installed in the signal processing device, the program automatically carrying out the number of method steps of the method after being started. The aforementioned data processing modules are preferably realized with the aid of the program.

A corresponding program can also be subsequently installed or stored by means of a computer program product according to the invention. The computer program product typically is a file or data medium with a file, the file containing the executable program, that is to say in particular suitable program code.

The above-described realization of a pre-amplification unit and the adjustment of the pre-amplification within the scope of the described fitting in the first fitting session part is not only advantageous in view of the execution of the main function of the hearing aid, that is to say the amplifier function, but also in view of known auxiliary functions, in which the digital input signals are used in any way according to the prior art. If such an auxiliary function is realized in the hearing aid according to the invention, the auxiliary function is preferably adapted in such a way that the pre-amplified digital input signals are used instead of the digital input signals.

What is known as adaptive directionality is an example of such an auxiliary function. In this case, the pre-amplified digital input signals are then used, for example, to activate and/or control noise suppression algorithms. Such algorithms are often based on an estimate for the ambient noise, which may be falsified in the case of input-side deviations.

A further example of such an auxiliary function is what is known as microphone noise reduction (MNR), which is also known as low-level expansion. This very simple algorithm is based on greatly reducing the hearing-aid gain, and hence the audible inherent noise, in very quiet situations. If the hearing aid perceives a higher level, the gain must be very quickly ramped up to the desired level again in order not to impair the speech intelligibility. Naturally, such an algorithm would be impaired in its functionality by an individual deviation of the input level.

What is known as a classification is a further example of such an auxiliary function. This is a hearing-aid function which attempts to classify the acoustic surroundings and subsequently change the configuration/function of the hearing aid on the basis of the acoustic class. Specifically, this means for example the following: if the hearing aid identifies on the basis of the input signal that it is located in a motor vehicle, the directionality of the hearing aid is modified such that the primary hearing direction is no longer to the front but controlled to the side or to the back. The so-called acoustic cues, on which the classification is based, depend in part on the spectral levels of the input signal.

Other features which are considered as characteristic for the invention are set forth in the appended claims.

Although the invention is illustrated and described herein as embodied in a method for fitting a digital hearing aid, a hearing aid and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are in each case provided with the same reference signs in all figures.

Figure 1:
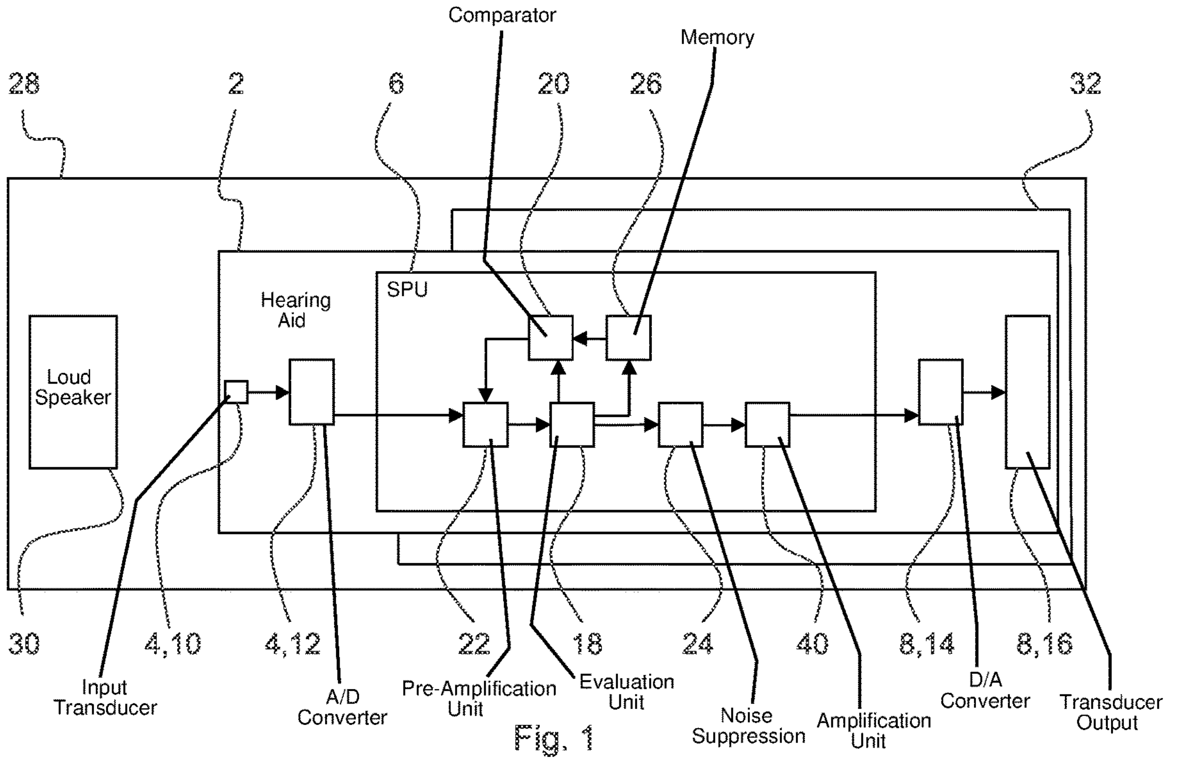
FIG. 1 is a block diagram of a digital hearing aid in an external reference testing device according to the invention.

Referring now to the figures of the drawings in detail and first, particularly to FIG. 1 thereof, there is shown a hearing aid 2 described below in exemplary fashion. It is in the form of a digital hearing aid 2 and contains an input transducer 4, a signal processing device 6 and an output transducer 8.

The input transducer 4 serves to generate digital input signals on the basis of acoustic input signals which are incident on the hearing aid 2 on the input side. To this end, the input transducer 4 has a microphone 10 and an analog-to-digital converter 12 in the exemplary embodiment. The corresponding digital input signals are processed in the signal processing device 6, with digital output signals being generated on the basis of the digital input signals. Acoustic output signals are generated by the output transducer 8 on the basis of the digital output signals and are output by the hearing aid 2 on the output side. In this case, the output transducer 8 according to FIG. 1 contains a digital-to-analog converter 14 and a loudspeaker 16.

The signal processing device 6 is furthermore configured to form a plurality of data processing modules or software program modules, specifically an evaluation unit 18, a comparator unit 20, a pre-amplification unit 22 and a main amplification unit 24. Moreover, the signal processing device 6 contains a permanent memory 26.

The method described in exemplary fashion below is used for fitting the hearing aid 2, the method containing at least three parts, specifically a pre-fitting session, a first fitting session part and a second fitting session part.

Of these three parts, the pre-fitting session is carried out first in time. It is preferably carried out at the manufacturer of the hearing aid 2. a reference testing device 28 with a loudspeaker 30 and a test holder 32 is used for the pre-fitting session. In this case, the test holder 32 is formed by an artificial head, for example. The hearing aid 2 is held by the test holder 32 during the pre-fitting session, as indicated in FIG. 1.

A specified digital signal is used during the pre-fitting session in order to generate an acoustic reference signal by means of the loudspeaker 30 of the reference testing device 28. Subsequently, a digital reference input signal, that is to say a digital input signal on the basis of the acoustic reference signal, then is generated by means of the input transducer 4 on the basis of the acoustic reference signal. Moreover, a reference quantity is determined on the basis of the digital reference input signal by means of the evaluation unit 18 of the signal processing device 6, and this reference quantity then is stored in the permanent memory 26 of the signal processing device 6.

The digital test signal, which is for example present as a file, preferably is a noise signal and in particular a noise signal with the given sound pressure level value of 65 dB, for example. By reproducing the digital test signal by means of the loudspeaker 30 of the reference testing device 28, noise is then generated as an acoustic reference signal, the noise being based on the digital test signal and being influenced by the reference testing device 28.

In the exemplary embodiment, the sound pressure level value of the noise now is determined as a reference quantity within the scope of the pre-fitting session by the evaluation unit 18 of the signal processing device 6, with the sound pressure level value determined during the pre-fitting session being influenced by the reference testing device 28, that is to say the loudspeaker 30, the test holder 32 and the remaining surroundings of the hearing aid 2, and by the components of the hearing aid 2, for example the microphone 10.

The two other specified parts of the method, that is to say the first fitting session part and the second fitting session part, are carried out at a service provider, for example an audiologist, in the exemplary embodiment. In this case, the first fitting session part is carried out first, followed by the second fitting session part. A testing device 34 with a loudspeaker 36 is used at least for the first fitting session part, and the hearing aid 2 is worn by a hearing-aid wearer 38 during the first fitting session part.

The digital test signal is used while carrying out the first fitting session part to generate an acoustic test signal with the aid of the loudspeaker 36 of the testing device 34. Then, a digital test input signal, that is to say a digital input signal that depends on the acoustic test signal, is generated on the basis of the acoustic test signal by means of the input transducer 4 of the hearing aid 2. Further, a sound pressure-dependent test quantity is determined on the basis of the digital test input signal by means of the evaluation unit 18 of the signal processing device 6. This sound pressure-dependent test quantity is then compared to the reference quantity stored in the permanent memory 26 of the signal processing device 4 by means of the comparator unit 20 and a deviation is determined between the sound pressure-dependent test quantity and the reference quantity. Then, a pre-amplification is adjusted by the pre-amplification unit 22 on the basis of the determined deviation.

By reproducing the digital test signal by means of the loudspeaker 36 of the testing device 34, noise is generated as an acoustic test signal, the noise being based on the digital test signal and being influenced by the testing device 34. The sound pressure level value of the noise is then determined in the exemplary embodiment as a sound pressure-dependent test quantity within the scope of the first fitting session part by the evaluation unit 18 of the signal processing device 6, with the sound pressure level value determined during the first fitting session part being influenced by the testing device 34, that is to say the loudspeaker 36 in particular, by the remaining surroundings of the hearing aid 2, that is to say also by the hearing-aid wearer 38, and by the components of the hearing aid 2, for example the microphone 10.

Therefore, the evaluation unit 18 of the signal processing device 6 typically determines two different sound pressure level values during the pre-fitting session and during the first fitting session part, despite the same digital test signal. These two sound pressure level values are compared to one another and a type of com-pensation is preferably carried out by adjusting the pre-amplification by the pre-amplification unit 22 of the signal processing device 6. In this context, the pre-amplification by the pre-amplification unit 22 is preferably adjusted in such a way at the sound pressure level value determined during the first fitting session part is changed toward the sound pressure level value determined during the pre-fitting session.

The pre-amplification is an additional amplification in addition to the main amplification by the main amplification unit 24. In the exemplary embodiment, the pre-amplification is adjusted independently of a hearing deficit of the hearing-aid wearer 38.

In contrast to the pre-amplification, the main amplification by the main amplification unit 24 is adapted to the hearing deficit of the hearing-aid wearer 38. This is implemented in the second fitting session part which follows the completion of the first fitting session part.

It is further expedient for the digital hearing aid 2 to be in the form of a multichannel hearing aid. Then, 4 to 10 channels are preferably realized in this case. In the case of such an embodiment of the hearing aid 2, the signal processing device 6 for example initially implements a channel-dependent and hence frequency-dependent separation or split of a digital input signal into a plurality of partial signals.

In this case, each partial signal reproduces a frequency range of the digital input signal assigned to a channel. The resultant partial signals are then further preferably processed further independently of one another in the individual channels and are combined at the end to form a digital output signal.

Figure 2:
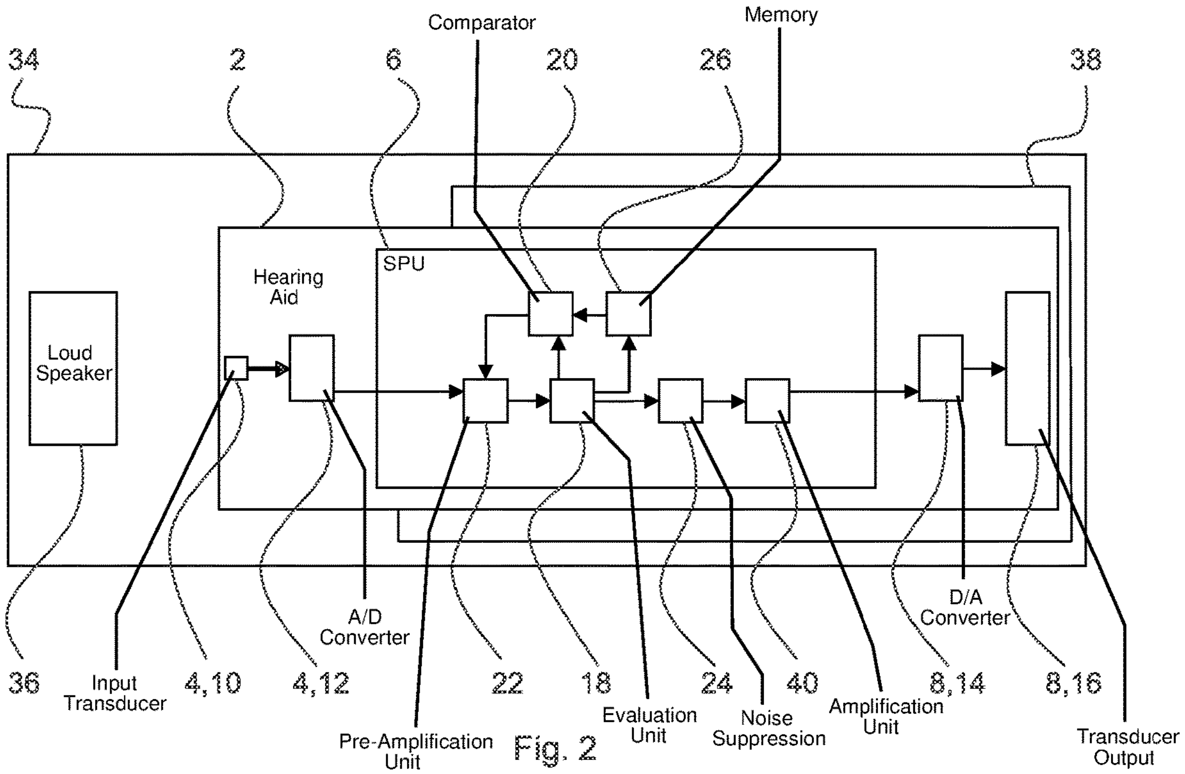
FIG. 2 is a block diagram of the digital hearing aid in the external testing device.

Then, an above-described signal processing is realized for each channel in an advantageous development by means of an evaluation unit 18, a comparator unit 20, a pre-amplification unit 22 and a main amplification unit 24. That is to say, the data processing modules shown in the signal processing device 6 in FIGS. 1 and 2 are then realized for each channel.

Independently thereof, the pre-amplification unit 22 is preferably upstream of the evaluation unit 18 from a signal processing point of view. That is to say that, in the sequence of the signal processing in the signal processing device 6, i.e., in the sequence of the individual process steps or the method steps of the signal processing, the pre-amplification unit 22 is applied first and the evaluation unit 18 is only applied during the further course of the signal processing. Further, the main amplification unit 22 is preferably downstream of the evaluation unit 18 from a signal processing point of view.

In most cases, the signal processing device 6 is furthermore configured to form an additional data processing module, specifically a module for noise suppression 40. In this case, noise suppression 40 is preferably disposed downstream of the main amplification unit 22 from a signal processing point of view.

Figure 3:
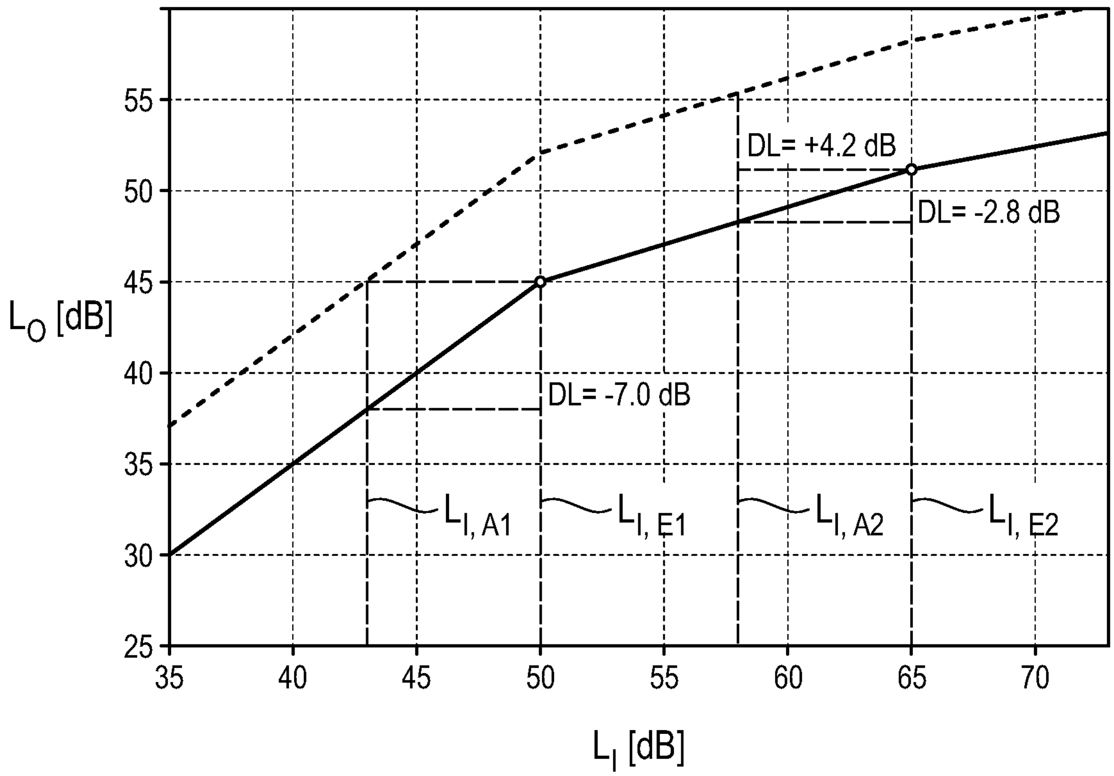
FIG. 3 is a graph showing two gain curves.

The main concept of the invention will subsequently still be explained on the basis of a schematic diagram, which is reproduced in FIG. 3.

In this case, the sound pressure level LO at the output of a digital hearing aid, referred to as output level for short, is depicted as a function of the sound pressure level LI at the input of the hearing aid, referred to as input level for short. In this case, the curve depicted in exemplary fashion with a solid line shows two so-called knee points at 50 dB and at 65 dB.

A simplified case is considered here for reasons of clarity, within the scope of which case input-side effects, for example a shadowing of the hearing-aid microphones, cause the sound pressure level LI registered by the hearing aid, that is to say in particular the sound pressure level LI registered under routine conditions (hearing aid is worn by the hearing aid wearer), to be reduced by a value of 7 dB in comparison with the case of the original reception, that is to say under laboratory conditions in particular (hearing aid is affixed to an artificial head). Moreover, only the difference at two different input levels is considered below.

Thus, the solid line now shows the output level of the hearing aid as a function of the input level. The hearing aid operates compressively, that is to say there are certain points, in this case the two aforementioned knee points, from where the output level increases more slowly than the input level. As a rule, the knee points are set such that a desired output level is obtained for a certain input signal, for example a speech-simulating noise at low and mid input levels.

In the case considered here, the level registered by the hearing aid as a result of input-side shadowing, that is to say under routine conditions in particular, now is 7 dB lower than expected. In FIG. 3, four level values are marked in exemplary fashion by dashed lines, specifically two expected level values LI,E1 and LI,E2 and two associated actually registered level values LI,A1 and LI,A2. In both cases, the actually registered level value is below the expected level value by 7 dB on account of the input-side shadowing.

This leads to the output level of the hearing aid deviating from the intended value or target value. However, this deviation DL is not constant as a result of the compressive behavior of the hearing aid. While it exactly corresponds to the difference of the input in terms of magnitude for low input levels, that is to say 7 dB in the comparison of LI,A1 with LI,E1, it is significantly lower at mid input levels, specifically 2.8 dB in the comparison of LI,A2 with LI,E2. This also illustrates the fundamental problem of such input-side effects.

If only a single measurement is then carried out at one test level, it is not possible to register the level dependency in its entirety. This is because if a measurement is carried out at a low input level, it is determined that the output level of the hear-ing aid is 7 dB too low. If the deviation is not compensated on the input side, as per the invention, but on the output side as per the prior art, that is to say by means of the standard amplification level, i.e., linearly, this leads to overcompen-sation at mid input levels. Such an output-side compensation according to the prior art in principle shifts the curve in FIG. 3 to the dashed line. In the example, the output level of the hearing aid at mid levels, that is to say in the comparison of LI,A2 with LI,E2, would be 4.2 dB too high.

Thus, conventionally, the output level of the hearing aid would have to be measured at a plurality of input levels and the knee points would be displaced as a correction. However, this has several disadvantages. Among others, the measuring outlay is relatively high. Further, the repetition accuracy of the measurement is low, in particular at low input levels. Moreover, a measurement at high input levels is required as a matter of principle, which is uncomfortable for the hearing-aid wearer. However, what is of particular importance is that a shift of the knee points only corrects the output level of the hearing aid. Many adaptive algorithms, for example the noise estimation or the control of directionality, are not corrected by this measure.

By contrast, an additional (pre-)amplification stage before the (main) amplification stage with compressive behavior brings about a complete compensation of the input-side effect. An increase of the (pre-)amplification of 7 dB in this case caus-es the actually registered level values, that is to say also LI,A1 and LI,A2, to be shifted to the expected level values, that is to say LI,E1 and LI,E2, respectively, and the hearing aid operates completely correctly in relation to the output level, but in par-ticular also in relation to adaptive, level-dependent signal processing algorithms.

In principle, all that is still required in that case is a single measurement at a test signal level, which firstly has a sufficient signal-to-noise ratio and secondly is not uncomfortably loud. During this measurement, the input of the hearing aid is measured and optionally corrected in the described method. The measurement of the output of the hearing aid can then be corrected by a linear amplification of the second amplification stage.

The following is a summary list of reference numerals and the corresponding structure used in the above description of the invention:

2 Hearing aid
4 Input transducer
6 Signal processing apparatus
8 Output transducer
10 Microphone
12 Analog-to-digital converter

14 Digital-to-analog converter
16 Loudspeaker
18 Evaluation unit
20 Comparator unit
22 Pre-amplification unit
24 Main amplification unit
26 Permanent memory
28 Reference testing device
30 Loudspeaker
32 Test holder
34 Testing device
36 Loudspeaker
38 Hearing-aid wearer
40 Noise suppression
LO Output level
LI Input level
LI,E1 Expected level value 1
LI,E2 Expected level value 2
LI,A1 Registered level value 1
LI,A2 Registered level value 2

The invention claimed is:

1. A method for fitting a digital hearing aid, which comprises the steps of:

providing the digital hearing aid having an input transducer, a signal processing device and an output transducer, the signal processing device having an evaluation unit, a comparator unit, a pre-amplification unit and a main amplification unit disposed downstream of the pre-amplification unit;

generating an acoustic test signal by means of an external testing device while the digital hearing aid is worn by a hearing-aid wearer;

generating a digital test input signal by means of the input transducer on a basis of the acoustic test signal;

determining a sound pressure-dependent test quantity on a basis of the digital test input signal by means of the evaluation unit;

determining a deviation between the sound pressure-dependent test quantity and a reference quantity stored in the signal processing device by means of the comparator unit; and adjusting a pre-amplification by the pre-amplification unit on a basis of the deviation determined.

2. The method according to claim 1, which further comprises:

using a specified digital test signal to generate an acoustic reference signal by means of an external reference testing device while the hearing aid is held by a test holder;

generating a digital reference input signal by means of the input transducer on a basis of the acoustic reference signal;

determining the reference quantity on a basis of the digital reference input signal by means of the evaluation unit; and storing the reference quantity in the signal processing device.

3. The method according to claim 2, which further comprises using the specified digital test signal to generate the acoustic test signal by means of the external testing device.

4. The method according to claim 1, wherein the pre-amplification unit is disposed upstream of the evaluation unit.

5. The method according to claim 1, wherein a main amplification by the main amplification unit is adjusted after the pre-amplification has been adjusted.

6. The method according to claim 5, which further comprises adjusting the main amplification on a basis of a hearing deficit of the hearing-aid wearer.

7. The method according to claim 1, wherein the main amplification unit is disposed downstream of the evaluation unit.

8. The method according to claim 1, which further comprises storing the sound pressure-dependent test quantity in the signal processing device.

9. The method according to claim 2, which further comprises:

linking the reference quantity to an identification feature which assigns the reference quantity to an underlying said digital test input signal; and storing the reference quantity with its associated said identification feature in the signal processing device.

10. The method according to claim 9, which further comprises:

determining a test feature on a basis of the digital test input signal by means of the evaluation unit; and determining the deviation between the test quantity and the reference quantity only if the identification feature is determined as the test feature.

11. The method according to claim 2, which further comprises:

using a plurality of specified digital test signals in succession to respectively generate the acoustic reference signal by means of the external reference testing device while the hearing aid is held by the test holder;

generating the digital reference input signal by means of the input transducer on a basis of the acoustic reference signal;

determining the reference quantity on a basis of the digital reference input signal by means of the evaluation unit;

linking each said reference quantity to an identification feature which assigns the reference quantity to a respective underlying digital test signal; and storing reference quantities with associated identification features in the signal processing device.

12. The method according to claim 11, wherein selecting a digital test signal from the specified digital test signals;

using the digital test signal selected to generate the acoustic test signal by means of the external testing device;

generating the digital test input signal by means of the input transducer on a basis of the digital test signal;

determining the sound pressure-dependent test quantity on a basis of the test input signal by means of the evaluation unit;

determining a test feature on a basis of the test input signal by means of the evaluation unit;

comparing the test feature to identification features stored by means of the comparator unit and the identification feature corresponding to the test feature is determined;

determining a deviation between the test quantity and the reference quantity linked to the identification feature determined by means of the comparator unit; and adjusting the pre-amplification by the pre-amplification unit on a basis of the deviation.

* * * * *